United States Patent [19]

Dymock et al.

[11] 4,455,218
[45] Jun. 19, 1984

[54] HYDROGENATION OF CARBONACEOUS MATERIAL

[75] Inventors: Kenneth R. Dymock; Malcolm C. Bell, both of Oakville, Canada

[73] Assignee: Inco Limited, Toronto, Canada

[21] Appl. No.: 469,440

[22] Filed: Feb. 24, 1983

[30] Foreign Application Priority Data

Feb. 24, 1982 [GB] United Kingdom ............... 8205496

[51] Int. Cl.³ ............................................. C10G 47/02
[52] U.S. Cl. .................................... 208/50; 208/108; 208/112; 208/143; 502/174
[58] Field of Search ................. 208/108, 112, 50, 143; 502/325, 174

[56] References Cited

U.S. PATENT DOCUMENTS

B 390,979 3/1976 Callighan et al. ............... 252/455 R
4,325,802 4/1982 Porter et al. ........................... 208/10

FOREIGN PATENT DOCUMENTS

2019881 11/1979 United Kingdom .

Primary Examiner—Delbert E. Gantz
Assistant Examiner—O. Chaudhuri
Attorney, Agent, or Firm—Francis J. Mulligan, Jr.; Raymond J. Kenny

[57] ABSTRACT

Discloses that in the hydrogenation of liquid, carbonaceous crude material such as bitumen and other heavy oils, a catalyst derived from the addition of $Fe_2(CO)_9$ is advantageously used to provide a superior yield of distillable oils compared to prior practice.

10 Claims, No Drawings

HYDROGENATION OF CARBONACEOUS MATERIAL

The present invention relates to the hydrogenation of liquid carbonaceous material, e.g. paraffinic crudes, for example bitumen, heavy oil, petroleum pitch, oil shale and conventional crude vacuum residues, and particularly to the hydrogenation of such material in the presence of a catalyst.

A great deal of effort has gone into developing catalysts that can tolerate bitumen and heavy oil hydrocracking conditions. These efforts have mainly drawn on the experience of petroleum hydrotreating and used supported heterogeneous catalysts which increase the yield of light, distillable hydrocarbons. However, the use of such catalysts, e.g. Co-Mo supported on an alumina base, has given rise to many problems: (1) the size of some molecules in pitch and other similar carbonaceous materials is too large in relation to the pore size of supported catalysts to be hydrogenated and these molecules are therefore left unreacted, (2) under the conditions necessary to hydrogenate bitumen etc. coke forms, which blinds the supported catalyst, (3) the presence of impurities in the carbonaceous material e.g. Ni, V, Fe, clay and silica foul the catalyst and so deactivate it.

There have been many attempts to overcome the above problems but none has met with complete success. For example, it has been reported that alkali metal promoters decrease catalyst coking and extend catalyst life. It has also been suggested that a Co-Mo catalyst on a coke support reduces coking and liability to fouling, but some coke is still formed.

The use of unsupported heterogeneous catalysts and of homogeneous catalysts has not been so generally studied because of the difficulty in recovering the catalyst from the hydrogenation product, and also because many homogeneous and unsupported heterogeneous catalysts are unstable under the rigorous hydrogenation conditions. No satisfactory method for catalyst recovery has hitherto been found.

The present invention circumvents the need to recover the catalyst by using a cheap and readily available substance as a catalyst which can be discarded without making the hydrogenation process uneconomic. Cheap materials, e.g. $Fe_2O_3$, $Al_2O_3$ and $TiO_2$, have been replaced commercially by supported Co-Mo catalysts despite the problems outlined above.

The present invention is based on the discovery that $Fe_2(CO)_9$ as a source of catalyst (a) is effective in catalysing the hydrogenation of bitumen, (b) is not poisoned by impurities in the feed bitumen and (c) because it is composed of cheap components, iron and carbon monoxide, it can be discarded without substantially prejudicing the economics of the hydrogenation process.

According to the present invention, there is provided a process of hydrogenating liquid carbonaceous crude material, which process comprises heating the material in contact with a catalyst derived from $Fe_2(CO)_9$ in the presence of a hydrogen-containing gas.

The process of the present invention is especially useful in the hydrogenation of bitumen, particularly Athabasca bitumen.

The reactions that occur in the hydrogenation of carbonaceous material are complex. It may be that the $Fe_2(CO)_9$ does not itself act as a catalyst but that it is converted under the conditions prevailing during hydrogenation into a different chemical species and it is that different species that acts as a catalyst. Whether that is the case or not, we have found that the addition of $Fe_2(CO)_9$ to the hydrogenation reaction mass of beneficial.

An advantage of $Fe_2(CO)_9$ as a source of catalyst is that it produces a superior yield of distillable oils, which are the most valuable product of hydrotreating bitumen and other heavy oils. A further advantage is that $Fe_2(CO)_9$ reduces coking compared to uncatalysed reactions and, under some conditions, can eliminate coking altogether. This is particularly advantageous in that after one hydrogenation step, the products can be distilled and the still bottoms, which contain the catalyst, can be recirculated to catalyse a further hydrogenation stage. When no coke is formed during hydrogenation, there is no coke build-up in such a cyclical operation, as a result of which the operation of the equipment is much easier. Fresh catalyst may optionally be added before each hydrogenation step in which case a portion of the still bottoms should occasionally be bled off to prevent a build-up of iron. The bleed portion may be coked to recover its content of valuable volatile oils and the iron values in the coke residue may be discarded because they have no commercial value.

$Fe_2(CO)_9$ is cheap and readily available. It can be produced by exposing $Fe(CO)_5$ to ultra violet light in glacial acetic acid or petroleum.

The hydrogenation is preferably carried out at a temperature of from 400° to 500° C., more preferably from 425° to 475° C., at a hydrogen partial pressure of from 500 to 5000 pounds per square inch (psi), which corresponds to 3,450 to 34,500 $kN/m^2$, more preferably from 2,500 to 3,500 psi (17,000 to 24,000 $kN/m^2$). The hydrogen-containing gas used in the hydrogenation may be pure hydrogen or a carbon monoxide-hydrogen mixture.

Three Examples of processes in accordance with the present invention will now be given.

EXAMPLE 1

400 g of Athabasca bitumen having the following composition:
in weight percent:

| | |
|---|---|
| C | 82.7 |
| H | 10.4 |
| N | 0.4 |
| O | 1.69 |
| S | 4.23 |
| Ash | 0.6 | and in parts per million:

| | |
|---|---|
| Ni | 77 |
| V | 220 |
| Fe | 408 | and a Conradson Carbon Residue of 12.6% was mixed with 4.36 g of $Fe_2(CO)_9$ and charged into a feed pot in which the mixture was heated to about 150° C. The feed pot was then pressurised with nitrogen to 200 psi (1380 $kN/m^2$) and when the charge had reached temperature, it was transferred to a pump feed pot, leaving that vessel with an overpressure of 40 psi. (275 $kN/m^2$). A high pressure Bran & Luebbe pump was then used to transfer the slurry from the feed pot, through 0.64 cm SS slurry transfer lines to a high pressure 1 liter Autoclave Engineers bolt and closure autoclave. The autoclave was then pressurized to 1000-2000 psi (6,890-13,780 kN/m²) with hydrogen, sealed and heated to the reaction temperature (400°-500° C.). Once at temperature, the pressure of the vessel was "topped off" at the required pressure. Pressure and temperature were maintained for a half hour and the autoclave was then cooled to about 150° C. All but 500 psi (3,450 kN/m²) of the overpressure was discharged through gas transfer lines through a still head, a high temperature condenser (25° C.) and a low temperature condenser (−20° C.) and collected in 40 liter sample tanks for gas chromatographic analysis. The contents of the autoclave were then discharged into a still which was heated. An atmospheric distillation was carried out in a closed system with reduced pressure in the low temperature condenser being used to adjust the pressure in the still and high temperature condenser to between 0 and 1 psig (between 0 and 7 kN/m²). The still bottoms were heated to about 350° C., distillate was collected from the high temperature condenser, and condensate was obtained from the low temperature condenser. The still bottoms were then allowed to drain into the pump feed pot. A fresh bitumen/catalyst slurry equal in weight to the distillate, condensate and hydrocarbon gases collected was then charged to the feedpot and transferred to the pump feed pot as described above. The mixture in the pump feed pot was then pumped to the high pressure autoclave and the above steps repeated. Testing continued for 6 complete cycles or until the still bottoms were too viscous to handle.

The results of this process and of similar processes using no catalyst and using Harshaw CoMo-0402T ⅛ catalyst, which is a Co-Mo catalyst supported on an alumina base, are shown in accompanying Table 1.

TABLE 1

| Catalyst | $Fe_2(CO)_9$ | none | Harshaw CoMo-0402T ⅛ |
|---|---|---|---|
| Concentration (g/100 g bitumen) | 1.09 | 0 | 1.0 |
| Gas | $H_2$ | $H_2$ | $2H_2/CO$ |
| Total pressure (kN/m²) | 20,700 | 20,700 | 31,000 |
| Hydrogen partial pressure (kN/m²) | 20,700 | 20,700 | 20,700 |
| T (°C.) | 450 | 450 | 450 |
| Residence time (h) | 1 | 1 | 1 |
| Cycles | 6 | 5* | 6 |
| $H_2$ consumption | 2.50 | 1.29 | 2.93 |
| Product Slate (g/100 g bitumen) | | | |
| CO | 1.41 | .52 | 2.37 |
| $CO_2$ | .29 | | |
| $H_2S$ | 3.02 | 1.98 | 2.37 |
| COS | .001 | 0 | .64 |
| $C_1$ | 3.27 | 5.10 | 4.16 |
| $C_2$ | 2.91 | 3.75 | 2.63 |
| $C_3$ | 3.37 | 4.16 | 3.10 |
| $iC_4$ | .60 | 1.12 | .49 |
| $nC_4$ | 1.09 | 3.72 | 1.35 |
| $iC_5$ | .11 | .17 | .17 |
| $nC_5$ | .13 | .20 | .30 |
| Naptha | 6.08 | 12.6 | 9.34 |
| Distillate | 47.1 | 31.2 | 51.1 |
| Bottoms | 32.6 | 20.3 | 25.1 |
| Coke | 0 | 14.2 | .65 |
| Total | 101.98 | 99.0 | 103.67 |
| Unaccounted | 0.52 | 2.27 | −.74 |
| Bitumen + $H_2$ | 102.5 | 101.29 | 102.93 |

*high viscosity of recycle bottoms terminated test

It can be seen from the results given in Table 1 that, under the prevailing conditions, the catalyst derived from $Fe_2(CO)_9$ suppresses all coke production and that it gives about the same yield of the desirable distillate fraction as a fresh supported Co-Mo catalyst, which can be expected to poison readily.

EXAMPLE 2

Processes similar to those described in Example 1 were performed except the numbers of cycles were not limited to 6 but the processes were continued until a steady state was reached. The product slate is shown in Table 2 for processes using $Fe_2(CO)_9$ as a source of catalyst, and Harshaw CoMo-0204T ⅛ catalysts and no catalyst. The Table also shows the percentage of the hydrogenation product that must be recycled after distillation.

TABLE 2

| T (°C.) | 450 | 450 | 450 |
|---|---|---|---|
| Catalyst | $Fe_2(CO)_9$ | none | Harshaw CoMo −0204T ⅛ |
| Concentration (g/100 g bitumen) | 1.09 | 0 | 1.0 |
| Net Product Slate (wt %) | | | |
| $CH_4$ | 4.03 | 6.82 | 6.08 |
| $C_2$-$C_5$ hydrocarbons | 10.7 | 15.9 | 10.1 |
| Condensate | 8.05 | 12.7 | 10.8 |
| Distillate | 73.8 | 36.3 | 67.6 |
| $H_2S$ & COS | 3.36 | 2.27 | 5.4 |
| Coke | 0 | 25.8 | 0 |
| Total | 100 | 100 | 100 |
| % Recycle | 62 | 45 | 62 |

It can be seen that the process employing an $Fe_2(CO)_9$ derived catalyst gives a much better yield of the valuable distillate fraction than the process employing no catalyst and an approximately equal yield of that fraction compared to a process employing the readily-poisoned supported Co-Mo catalyst.

EXAMPLE 3

Three sets of tests similar to those described in Example 1 were performed in the presence of catalysts derived from (a) $Fe(CO)_5$ and (b) $Fe_2(CO)_9$ and (c) no catalyst. The results of these tests can be compared directly because they were all performed on Athabasca bitumen from the same batch. The conditions used in the tests are set out in Table 3:

TABLE 3

| Test | 384–389 | 371–376 | 390–395 |
|---|---|---|---|
| Catalyst | None | Fe(CO)$_5$ | Fe$_2$(CO)$_9$ |
| Catalyst addition | — | continuous | continuous |
| Catalyst conc. (g/100 g bitumen) | — | 0.99 | 0.99 |
| Gas | H$_2$ | H$_2$ | H$_2$ |
| Total pressure (kN/m$^2$) | 20,700 | 20,700 | 20,700 |

TABLE 3-continued

| Partial pressure (H$_2$) | 20,700 | 20,700 | 20,700 |
|---|---|---|---|
| T(°C.) | 450 | 450 | 450 |
| Residence time (h) | 0.5 | 0.5 | 0.5 |
| Cycles | 6 | 6 | 6 |

The composition of the bitumen feed and the hydrogenation products for the three sets of tests are shown in Tables 4, 5 and 6. The product slates for the three sets of tests are given in Table 7.

TABLE 4

ELEMENTAL ANALYSIS FOR FEED AND PRODUCTS IN TESTS 384–389
NO CATALYST

| | Weight, % | | | | | | ppm | | | |
|---|---|---|---|---|---|---|---|---|---|---|
| Material | C | H | N | O | S | Ash | Ni | V | Fe | H/C |
| Athabasca Bitumen | 85.5 | 10.9 | 0.41 | 0.78 | 3.55 | 0.52 | 74 | 204 | 315 | 1.52 |
| Cycle 1 Condensate | 82.4 | 14.3 | <0.1 | 0.81 | 1.23 | — | 1.6 | <2 | 2.2 | 2.07 |
| Cycle 2 Condensate | 82.0 | 14.6 | <0.1 | 1.05 | 0.60 | — | 1.8 | <2 | 2.3 | 2.12 |
| Cycle 3 Condensate | 85.0 | 13.9 | <0.1 | 0.64 | — | — | 0.8 | <2 | 1.8 | 1.95 |
| Cycle 4 Condensate | 83.9 | 14.3 | <0.1 | 0.20 | 0.81 | — | 1.6 | <2 | 2.2 | 2.03 |
| Cycle 5 Condensate | 85.8 | 14.8 | <0.1 | 0.48 | 0.65 | — | 1.6 | <2 | 2.3 | 2.06 |
| Cycle 6 Condensate | 81.1 | 13.9 | <0.1 | 0.29 | 0.97 | — | 1.8 | <2 | 2.3 | 2.04 |
| Cycle 1 Distillate | 84.9 | 12.4 | <0.1 | 1.09 | 1.46 | — | 0.7 | <2 | 1.2 | 1.74 |
| Cycle 2 Distillate | 84.1 | 12.2 | <0.1 | 0.79 | 1.68 | — | 0.8 | <2 | 1.4 | 1.73 |
| Cycle 3 Distillate | 84.0 | 12.9 | <0.1 | 0.56 | 1.47 | — | 1.0 | <2 | 1.5 | 1.83 |
| Cycle 4 Distillate | 87.6 | 11.9 | <0.1 | 0.39 | 1.62 | — | 1.0 | <2 | 1.2 | 1.62 |
| Cycle 5 Distillate | 85.3 | 12.0 | <0.1 | 0.48 | 1.46 | — | 0.8 | <2 | 1.3 | 1.68 |
| Cycle 6 Distillate | 84.9 | 12.2 | <0.1 | 0.44 | 1.60 | — | 1.0 | <2 | 1.2 | 1.71 |
| Cycle 6 Bottoms | 87.4 | 6.29 | 0.94 | 0.85 | 4.20 | 0.22 | 80 | 186 | 254 | 0.86 |
| Cycle 6 Coke Residue | 81.8 | 3.68 | 1.32 | 3.49 | 4.13 | 6.54 | 1090 | 1380 | 0.97% | 0.54 |

TABLE 5

ELEMENTAL ANALYSIS FOR FEED AND PRODUCTS IN TESTS 371–376
Fe(CO)$_5$ AS CATALYST SOURCE

| | Weight, % | | | | | | ppm | | | |
|---|---|---|---|---|---|---|---|---|---|---|
| Material | C | H | N | O | S | Ash | Ni | V | Fe | H/C |
| Athabasca Bitumen | 85.5 | 10.9 | 0.41 | 0.78 | 3.55 | 0.52 | 74 | 204 | 315 | 1.52 |
| Cycle 1 Condensate | 83.0 | 14.2 | <0.1 | 1.09 | 0.71 | — | 2 | <2 | 50 | 2.04 |
| Cycle 2 Condensate | 83.6 | 14.5 | <0.1 | 2.28 | 0.32 | — | 1 | <2 | 13,000 | 2.07 |
| Cycle 3 Condensate | 84.0 | 13.8 | <0.1 | 1.88 | 0.99 | — | 1 | <2 | 11,500 | 1.96 |
| Cycle 4 Condensate | 83.1 | 14.3 | <0.1 | 1.40 | 0.43 | — | 2 | <2 | 500 | 2.05 |
| Cycle 5 Condensate | 81.6 | 14.1 | <0.1 | 1.51 | 0.30 | — | 2 | <2 | 7,500 | 2.06 |
| Cycle 6 Condensate | 83.7 | 13.5 | <0.1 | 1.75 | 0.37 | — | 1 | 2 | 5,000 | 1.92 |
| Cycle 1 Distillate | 86.9 | 13.3 | <0.1 | 1.16 | 1.32 | — | 1 | <2 | 14 | 1.82 |
| Cycle 2 Distillate | 87.2 | 12.5 | <0.1 | 1.03 | 1.36 | — | 1 | <2 | 70 | 1.71 |
| Cycle 3 Distillate | 85.0 | 12.2 | 0.11 | 1.19 | 1.52 | — | <1 | <2 | 330 | 1.71 |
| Cycle 4 Distillate | 84.3 | 13.4 | <0.1 | 1.36 | 0.93 | — | 1 | <2 | 6 | 1.89 |
| Cycle 5 Distillate | 85.8 | 12.3 | 0.15 | 0.99 | 1.32 | — | <1 | <2 | 1 | 1.71 |
| Cycle 6 Distillate | 87.5 | 12.7 | 0.15 | 1.13 | 1.07 | — | 1 | <2 | 2 | 1.73 |
| Cycle 6 Bottoms | 89.0 | 8.64 | 1.02 | 1.14 | 4.23 | 1.79 | 169 | 340 | 5,925 | 1.16 |
| Cycle 6 Coke Residue | 67.9 | 3.01 | 1.24 | 1.46 | 3.57 | 25.8 | 662 | 856 | 5.18% | 0.53 |

TABLE 6

ELEMENTAL ANALYSIS FOR FEED AND PRODUCTS IN TESTS 390–395
Fe$_2$(CO)$_9$ AS CATALYST SOURCE

| | Weight, % | | | | | | ppm | | | |
|---|---|---|---|---|---|---|---|---|---|---|
| Material | C | H | N | O | S | Ash | Ni | V | Fe | H/C |
| Athabasca Bitumen | 85.5 | 10.9 | 0.41 | 0.78 | 3.55 | 0.52 | 74 | 204 | 315 | 1.52 |
| Cycle 1 Condensate | 81.8 | 13.5 | <0.1 | 0.92 | 0.52 | — | 5.0 | <2.5 | 3.5 | 1.97 |
| Cycle 2 Condensate | 85.3 | 14.6 | <0.1 | 0.81 | 0.69 | — | 5.1 | <2.5 | 14.7 | 2.04 |
| Cycle 3 Condensate | 83.4 | 14.1 | <0.1 | 0.61 | 0.57 | — | 5.3 | <2.5 | 9.6 | 2.01 |
| Cycle 4 Condensate | 82.1 | 13.9 | <0.1 | 0.83 | 0.57 | — | 4.7 | <2.5 | 840 | 2.02 |
| Cycle 5 Condensate | 85.6 | 14.7 | <0.1 | 0.97 | 0.55 | — | 4.0 | <2.5 | 268 | 2.05 |
| Cycle 6 Condensate | 83.2 | 14.6 | <0.1 | 0.85 | 0.32 | — | 5.5 | <2.5 | 13.1 | 2.09 |
| Cycle 1 Distillate | 85.3 | 12.4 | <0.1 | 1.04 | 1.04 | — | 3.0 | <2.5 | 2.6 | 1.73 |
| Cycle 2 Distillate | 85.6 | 12.6 | 0.12 | 0.94 | 1.30 | — | 3.5 | <2.5 | 2.6 | 1.76 |
| Cycle 3 Distillate | 85.9 | 12.0 | 0.17 | 1.09 | 1.35 | — | 3.8 | <2.5 | 2.6 | 1.66 |
| Cycle 4 Distillate | 86.1 | 12.4 | 0.17 | 0.87 | 1.30 | — | 3.7 | <2.5 | 2.6 | 1.72 |
| Cycle 5 Distillate | 86.8 | 12.9 | 0.15 | 1.13 | 1.24 | — | 3.5 | <2.5 | 4.0 | 1.77 |
| Cycle 6 Distillate | 86.1 | 12.2 | 0.18 | 0.97 | 1.19 | — | 3.5 | <2.5 | 2.9 | 1.69 |

TABLE 6-continued
ELEMENTAL ANALYSIS FOR FEED AND PRODUCTS IN TESTS 390-395
$Fe_2(CO)_9$ AS CATALYST SOURCE

| Material | Weight, % | | | | | | ppm | | | H/C |
| --- | --- | --- | --- | --- | --- | --- | --- | --- | --- | --- |
| | C | H | N | O | S | Ash | Ni | V | Fe | |
| Cycle 6 Bottoms | 85.8 | 8.19 | 1.17 | 1.94 | 1.50 | 2.00 | 214 | 459 | 0.68% | 1.14 |

TABLE 7

| Test | 384–387 | 371–376 | 390–395 |
| --- | --- | --- | --- |
| Catalyst Source | none | $Fe(CO)_5$ | $(Fe_2(CO)_9$ |
| Conversion* (%) | 80.1 | 87.3 | 92.8 |
| H$_2$ Consumption (g/100 g bitumen) | 1.87 | 2.40 | 2.83 |
| Product Slate (g/100 g bitmen) | | | |
| CO$_1$CO$_2$ | 0.23 | 1.11 | 0.66 |
| H$_2$S | 3.84 | 4.11 | 4.39 |
| COS | 0.0 | 0.0 | 0.0 |
| C$_1$ | 4.67 | 2.7 | 2.69 |
| C$_2$ | 4.11 | 2.95 | 2.56 |
| C$_3$ | 4.90 | 4.07 | 3.81 |
| iC$_4$ | 0.79 | 0.69 | 0.43 |
| nC$_4$ | 3.02 | 2.39 | 2.19 |
| iC$_5$ | 1.49 | 1.16 | 1.12 |
| nC$_5$ | 3.29 | 2.51 | 2.32 |
| Condensate | 3.87 | 4.33 | 4.28 |
| Distillate | 34.94 | 47.81 | 51.01 |
| Bottoms | 17.57 | 27.98 | 30.22 |
| Coke | 13.30 | 6.79 | 0.0 |
| Total | 96.00 | 108.60 | 105.68 |
| Unaccounted | +5.87 | −6.20 | −2.85 |
| Bitumen + H$_2$ | 101.87 | 102.40 | 102.83 |

*Conversion = $([wt_{bitumen} - wt_{cokeT}] \times 10^2)/wt_{bitumen}$  $wt_{cokeT} = wt_{coke} + [wt_{bottoms} \times CCR_{bottoms} \times 1.3]$ It can be seen by comparing the iron contents of the condensate, the distillate and the bottoms given in Tables 5 and 6 that, in the case of $Fe(CO)_5$, iron reports to the valuable hydrogenation products and it may well be necessary to include an additional process step to remove this iron from the products. On the other hand, in the case of $Fe_2(CO)_9$, iron reports primarily to the still bottoms which has two advantages, (a) the catalyst is recycled in a continuous operation in which the bottoms are mixed with further bitumen and subjected to further hydrogenation, and thus the consumption of catalyst is lower than in the case of $Fe(CO)_5$ and (b) the hydrogenation products contain less iron impurity than the products of hydrogenation with $Fe(CO)_5$.

With reference to Table 7, it can be seen that catalysts derived from both $Fe(CO)_5$ and $Fe_2(CO)_9$ catalyse hydrogenation in that they both increase the yield of the distillate and condensate fractions as compared to the uncatalysed reaction, however $Fe_2(CO)_9$ as a catalyst source is the more effective of the two. Furthermore, it can be seen that $Fe_2(CO)_9$ completely eliminates coke formation, which is highly advantageous, whereas $Fe(CO)_5$ does not.

We claim:

1. A process of directly hydrogenating liquid carbonaceous material, which process consists essentially of reacting the material with hydrogen in the presence of a catalyst derived by exposing $Fe_2(CO)_9$ to the conditions of said hydrogenation.

2. A process as claimed in claim 1, wherein the hydrogenation is carried out at a temperature of from 400° to 500° C.

3. A process as claimed in claim 2, wherein the temperature is from 425° to 475° C.

4. A process as claimed in claim 1, wherein the hydrogenation is carried out at a hydrogen partial pressure of from 3,450 to 34,500 kN/m$^2$.

5. A process as claimed in claim 4, wherein the hydrogen partial pressure is from 17,000 to 24,000 kN/m$^2$.

6. A process as claimed in claim 1, wherein said hydrogen is supplied as a gas from the group of hydrogen and hydrogen/carbon monoxide mixtures.

7. A process as claimed in claim 1, wherein the liquid carbonaceous material is bitumen.

8. A process as claimed in claim 1, wherein the hydrogenation products are distilled and the still residue is mixed with a fresh batch of liquid carbonaceous material and subjected to a further hydrogenation step.

9. A process as claimed in claim 8, wherein fresh $Fe_2(CO)_9$ is mixed with the said fresh batch of liquid carbonaceous material prior to the further hydrogenation step.

10. A process as claimed in claim 8, wherein a portion of the still residue is bled off, coked and the catalyst is not recovered from the residue.

* * * * *